United States Patent [19]

Puchy

[11] 4,092,896
[45] June 6, 1978

[54] SEALING WASHER
[76] Inventor: David Peter William Puchy, 30 The Crescent, Cheltenham, New South Wales 2119, Australia
[21] Appl. No.: 785,815
[22] Filed: Apr. 8, 1977
[30] Foreign Application Priority Data Apr. 30, 1976 Australia .............................. PC5752

[51] Int. Cl.² .......................... F16B 21/00; A47G 3/00
[52] U.S. Cl. ....................................... 85/50 R; 85/53; 85/1 JP; 277/212 C
[58] Field of Search ................ 85/1 JP, 50 R, 53, 55; 277/152, 165, 212 C, 212 R

[56] References Cited

U.S. PATENT DOCUMENTS

| 1,711,415 | 4/1929 | Lane | 85/1 JP |
| 3,796,124 | 3/1974 | Crosa | 85/1 JP X |
| 3,930,432 | 1/1976 | Puchy | 85/53 |

FOREIGN PATENT DOCUMENTS

| 270,451 | 2/1914 | Germany | 85/50 R |
| 27,703 | 3/1964 | Germany | 85/53 |
| 374,858 | 3/1964 | Switzerland | 85/50 R |
| 866,922 | 5/1961 | United Kingdom | 85/50 R |
| 885,160 | 12/1961 | United Kingdom | 85/53 |
| 993,021 | 5/1965 | United Kingdom | 85/1 JP |

Primary Examiner—Robert S. Ward, Jr.
Attorney, Agent, or Firm—Seidel, Gonda & Goldhammer

[57] ABSTRACT

The invention provides a washer having a deformable annular skirt extending from the underside of the washer. The skirt deforms to the shape of the surface to which the washer is secured by means of a fastening device having a shank passing through the washer. The resiliency of the skirt seals the cavity between the underside of the washer and the surface from moisture. The washer is particularly suitable for use with corrugated surfaces and for retaining the swarf produced by self drilling fastening devices. A snap-on cap for the washer is also provided to seal the head of the fastening device.

7 Claims, 3 Drawing Figures

SEALING WASHER

The present invention relates generally to the washer and cap sealing device for fastening elements of the general type disclosed in U.S. Pat. No. 3,930,432.

The sealing device disclosed in the abovementioned patent application comprises an annular washer through which the shank of a fastening element such as a screw or bolt is inserted. The washer has a recess in its upper side to receive the head of the screw or bolt. In addition the washer has an outer peripheral lip adjacent its upper side which is co-operable with an inner annular lip on the inner surface of a convex snap on cap or cup cover for the washer.

With the cap engaged with the washer, the abovementioned lips are interengaged to seal the cap and washer and provide a sealed cavity between the cap and washer within which the head of the abovementioned fastening device is normally located. In this way a seal is provided between the outer surface of the washer and the fastening element head and shank.

In order to complete the seal between the fastening device and the object into which the fastening device is inserted, the washer disclosed in the abovementioned U.S. patent has an inner annular skirting rim provided at its lower side co-axial with the central aperture through the annular washer. The inner diameter of the skirting rim is dimensioned to be smaller than the inner diameter of the threaded shank of the fastening element.

Therefore during installation of the fastening element and the sealing device, the innermost regions of the skirting rim are forced between the threads of the shank and the inner surface of the shank receiving aperture in the object into which the fastening device is inserted. In this way an effective seal is provided between the under side of the washer and the object into which the fastening element is inserted.

It is the object of the present invention to provide a modification to the abovementioned washer which enables the effectiveness of the abovementioned seal to be increased particularly, but not exclusively, in relation to the sealing between the washer and an object having a corrugated, or otherwise profiled, surface.

According to one aspect of the present invention the abovementioned object is achieved by an annular washer to provide a seal between the surface of an object into which a fastening device, having a shank passing through said washer, is inserted; said annular washer having a substantially flat region on the underside of an annular boss surrounding surrounding the central aperture through said washer, and having a peripheral downwardly outwardly extending resiliently deformable tapered annular skirt, said tapered skirt having its rim located below said flat region and being joined to the periphery of said boss by a deformable annular diaphragm located above said flat region. In addition the present invention also provides a mutually engageable washer and cap.

One preferred embodiment of the present invention will now be described with reference to a combination washer and cap sealing device, formed from plastics, which is particularly suitable for sealing between a corrugated surface and a fastening device.

The preferred embodiment of the washer and cap sealing device is illustrated in the drawings in which.

Figure 1:
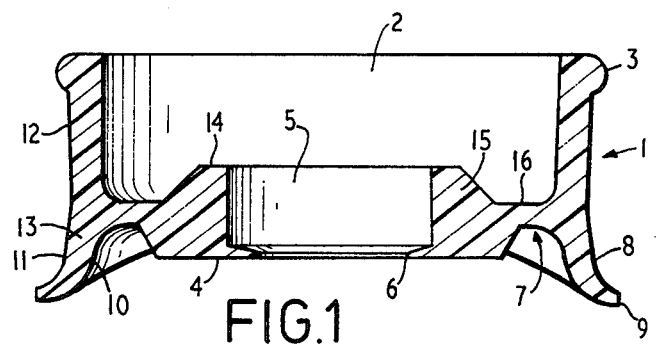
FIG. 1 is a cross-sectional view of the preferred form of the washer with the annular shirt deformed.

Referring now to FIG. 1, the annular washer 1 has a head receiving recess 2 formed in its upper side and an outer peripheral annular lip 3 adjacent its upper side as described above in connection with the washer disclosed in the abovementioned U.S. Patent. The lower side of the washer 1 comprises a substantially flat annular region 4 surrounding the central aperture 5 of the washer 1 through which the threaded shank of the fastening device is to be inserted.

The central aperture 5 has an inwardly protruding circular rim 6 located therein, preferably adjacent the lower side of the washer 1. The inner diameter of the rim 6 is selected to fall between the inner and outer diameters of the threaded shank, however, the diameter of the central aperture 5 is slightly larger than the outer diameter of the threaded shank. Therefore when the shank is inserted through the washer 1 the rim 6 maintains the washer 1 on the shank. The rim 6 is not able to be forced into the shank receiving cavity of the object into which the fastening device is inserted unlike the skirting rim disclosed in the abovementioned Australian patent application.

The flat annular region 4 is surrounded by an annular groove 7 in the lower side of the washer 1. The groove 7 is itself surrounded by a peripheral downwardly outwardly extending tapered annular skirt 8. The skirt 8 is resiliently deformable and has its rim or edge 9 located below the level of the flat annular surface 4. The skirt 8 is of equal depth and deforms when brought into contact with a corrugated surface as illustrated in cross-section in FIG. 1 and in perspective in FIG. 3. The cross-section, as seen in FIG. 1 of the tapered skirt 8 is bounded by two curves. The first curve is an outwardly convex radiused curve 10 substantially tangential to the outer side of the groove 7. The second curve 11 is an outwardly convex radiused curve substantially tangential to the cylindrical side 12 of the washer 1.

The radius of curvature of the first (inner) curve 10 is larger than that of the second (outer) curve 11 so that the skirt 8 tapers outwardly making the edge 9 thin. The radii of curvature are selected relative to the radius of curvature of a concave corrugated surface to ensure that the skirt 8 deforms outwardly in use. The skirt 8 also merges with the washer 1 in a broad shoulder 13 which is capable of deformation above the level of the annular flat surface 4.

The area 14 in the head receiving recess 2 surrounding the central aperture 5 is shaped to provide a surface which abuts the underside of the head of the fastening device. The washer cross-section adjacent the central aperture 5 is thickened to provide a central boss 15 supported by a relatively thin annular diaphram 16 which is deformable.

Figure 2:
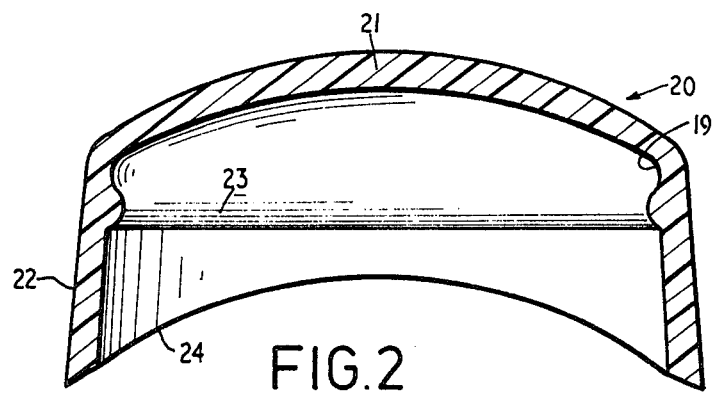
FIG. 2 is a cross-sectional view of the preferred form of the cap.

As seen in FIG. 2, the snap on cap 20 of the preferred embodiment comprises a flattened quasi-hemispherical dome 21 and a cylindrical side wall 22. An annular lip 23 of substantially semi-circular cross-section extends around the inner surface of the cap 20. The lip 23 co-operates with the lip 3 of the washer 1 to enable the cap 20 to be snapped over and cover the washer 1. As explained in the abovementioned U.S. Patent, the lip 3 and the inner surface 19 of the dome 21 interengage to provide a seal between the washer 1 and cap 20. This seal prevents water entering the head receiving recess 2 by means of passing between the washer 1 and cap 20.

The lower edge 24 of the cylindrical side wall 22 is provided with a substantially sinusoidal profile so that the height of the cylindrical side wall 22 varies around the cap 20. The sinusoidal profile may be visualized as the line of intersection of two perpendicular cylinders.

In order to seal a fastening device which secures a corrugated roofing sheet (for example) to a purlin or beam, with the washer and cap of the preferred embodiment, the shank of the fastening device is passed through the central aperture 5. Thus the head of the fastening device is located in the head receiving recess 2. Also the washer 1 is retained on the shank by the rim 6 which is retained in the thread on the shank.

The fastening device is then passed through the roofing sheet and secured to the beam. As the fastening device is tightened the edge 9 of the tapered skirt 8 is turned outwardly thereby bringing only a narrow continuous closed strip of the inner side of the skirt 8 into contact with the corrugated surface.

In consequence the resilient restoring force produced by the deformation of the skirt 8 is applied to the corrugated surface only through a very small area of the inner surface of the skirt 8. Therefore a large pressure is exerted over a narrow continuous closed strip of the corrugated surface and an extremely effective high pressure seal is thereby created.

As a result of this effective high pressure seal the enclosed volume between the outer surface of the roofing sheet, the skirt 8 and flat annular region 4 is effectively sealed. This prevents any moisture passing under the skirt 8 and thereby rusting either the shank of the fastening device and/or the thin cross-section of the roofing sheet exposed when the opening in the sheet, through which the shank passes, was formed.

The abovementioned seal is particularly important when self drilling and self tapping fastening devices are used. Such devices cut the necessary opening in the roofing sheet and thereby produce metal cuttings or swarf. This swarf is retained within the sealed cavity between the washer 1 and the roofing sheet and therefore cannot rust. Thus there is no loose swarf left on the roofing surface as has hitherto been the case, so that the roofing surface is not stained with rust marks caused by rusting swarf.

In addition, since the washer 1 rotates with the fixing device, the skirt 8 sweeps the swarf clear of the sealing surfaces. As the swarf is retained with the sealed cavity it cannot interfere with or impair, the seal between the washer 1 and the roofing sheet.

Figure 3:
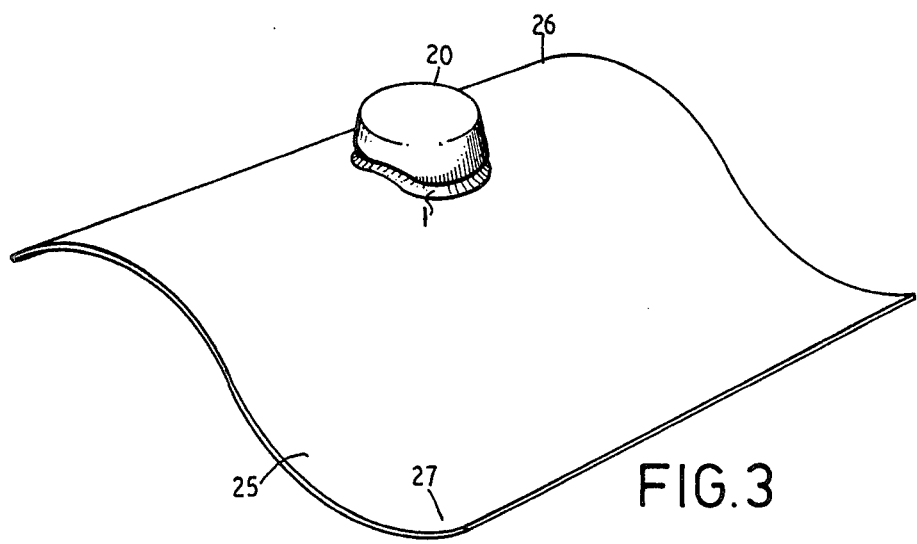
FIG. 3 is a perspective view of the assembled washer and cap sealing a fastening device (not shown) secured to a currugated roofing sheet.

FIG. 3 illustrates the washer 1 and cap 20 assembled over a fastening device (not shown) which has been used to secure a corrugated roofing sheet 25 to a beam (not shown). The fastening device has been located at a crest 26 and therefore the deformation of the skirt 8 is greater at the two regions in line with the crest, than the deformation at each of the two regions to either side of the crest 26.

The cap 20 is snapped onto the washer 1 with the correct orientation so that the two longer portions of the side wall 22 are located one to each side of the crest 26. The lower edge 24 of the side wall 22 is shaped so as to provide a substantially constant clearance between the lower edge 24 and the deformed skirt 8. Preferably such clearance is approximately 0.020 inch.

Since the cap 20 is sealed to the washer 1, which is itself sealed to the roofing sheet 25, no moisture can reach the fastening device and cause it to rust or corrode.

As the fastening device is secured to the beam, the boss 15 of the washer 1 deforms the upper surface of the ridge 26 and slightly flattens the curve of the ridge 26. The annular diaphram 16 also deforms slightly to permit the relative positions of the boss 15 and skirt 8 to alter. This deformation results in a more secure bond between the roofing sheet 25 and the beam.

It will be apparent to those skilled in the art that the fastening device may be located in a trough 27 of the roofing sheet 25 without affecting the action of the above described washer. However, the orientation of the profiled lower edge 24 of the cylindrical side wall 22 of the cap 20 must be selected according to the position of the fastening device in order to provide the abovementioned constant clearance between the cap and the deformed skirt 8.

In addition, when the fastening device is located in a trough 27, the annular diaphram 16 deforms to permit the boss 15 to contact the roofing sheet 25.

The foregoing described only one embodiment of the present invention and modifications, obvious to those skilled in the art, may be made thereto without departing from the scope of the present invention.

For example, the washer of the present invention is not restricted solely to use with corrugated surfaces but may also be used in conjunction with flat or profiled surfaces. The invention is also not restricted to fastening devices having threaded shanks but is also applicable to nails, bolts, rivets and the like.

What I claim is:

1. An annular washer to provide a seal between the upper surface of an object into which a fastening device, having a shank passing through said washer, is inserted; said annular washer having a substantially flat region on the underside of an annular boss surrounding the center aperture through said washer, and having a peripheral downwardly, outwardly extending resiliently deformable tapered annular skirt, said tapered skirt having its rim located below said flat region and being joined to the periphery of said boss by a deformable annular diaphragm.

2. The washer as claimed in claim 1 wherein said boss has a substantially flat annular area on the upper surface thereof surrounding said central aperture, and the diameter of said boss at said area is less than the diameter of said boss adjacent said diaphragm.

3. The washer as claimed in claim 1 wherein the cross-sectional area of said skirt is bounded by two curves, the first of said curves merging with the periphery of said diaphragm and being outwardly convex, the second of said curves being substantially tangential to the periphery of said washer and outwardly convex, and the radius of curvature of said first curve being larger than that of said second curve.

4. The washer as claimed in claim 1 wherein the diameter of said central aperture is larger than the diameter of the shank of the fastening device intended for use therein and said central aperture includes an inwardly protruding circular rim.

5. The washer as claimed in claim 4 wherein the periphery of said washer comprises a cylindrical wall having an exterior annular lip thereon and defining a head receiving recess in the upperside of said washer.

6. A washer and cap assembly comprising the washer as claimed in claim 5 and a cap having a flattened quasi-hemispherical dome and a substantially cylindrical side wall having an interior annular lip protruding therefrom, said exterior and interior lips being co-operable to form a seal between said washer and cap.

7. The washer and cap assembly as claimed in claim 6 wherein the lower edge of said cylindrical side wall is sinusoidally shaped.

* * * * *